United States Patent [19]

Onsrud

[11] Patent Number: 4,893,661
[45] Date of Patent: Jan. 16, 1990

[54] DRIVE BELT TENSION CONTROL APPARATUS FOR INVERTED ROOTER

[75] Inventor: Thomas C. Onsrud, Troutman, N.C.

[73] Assignee: C. R. Onsrud, Inc., Troutman, N.C.

[21] Appl. No.: 313,983

[22] Filed: Feb. 22, 1989

[51] Int. Cl.⁴ .................................................. B27C 5/02
[52] U.S. Cl. .............................. 144/134 A; 144/136 R; 144/145 A; 409/97; 409/110; 474/110; 474/114
[58] Field of Search ............... 474/110, 113, 114, 133, 474/136; 409/97, 110; 144/137, 134 R, 134 A, 134 B, 144 R, 145 R, 145 A, 371, 136 R

[56] References Cited

U.S. PATENT DOCUMENTS

| | | | |
|---|---|---|---|
| 700,813 | 5/1902 | Phillips | 144/145 A |
| 2,563,655 | 8/1951 | Martensson | 144/134 A |
| 2,782,817 | 2/1957 | Steiner | 744/134 A |
| 3,872,801 | 3/1975 | Weddendorf | 474/114 |
| 3,916,965 | 11/1975 | Attridge et al. | 144/134 R |
| 4,051,742 | 10/1977 | Johansson et al. | 474/110 |
| 4,094,205 | 6/1978 | Cook | 474/110 |
| 4,172,490 | 10/1979 | Ware | 474/110 |
| 4,537,234 | 8/1985 | Onsrud | 144/134 A |

Primary Examiner—W. Donald Bray
Attorney, Agent, or Firm—W. Thad Adams, III

[57] ABSTRACT

An inverted router characterized by having a drive motor, a motor driven pulley, a spindle drive pulley and a drive belt for transferring power from the motor driven pulley to the spindle and drive belt tension control apparatus. The drive belt tension control apparatus comprises a mounting plate for mounting the motor driven pulley in variable spaced-apart relation to the spindle drive pulley and a pneumatic cylinder and piston assembly for exerting a predetermined pressure on the motor drive pulley and thereby a predetermined tension on the drive belt.

18 Claims, 3 Drawing Sheets

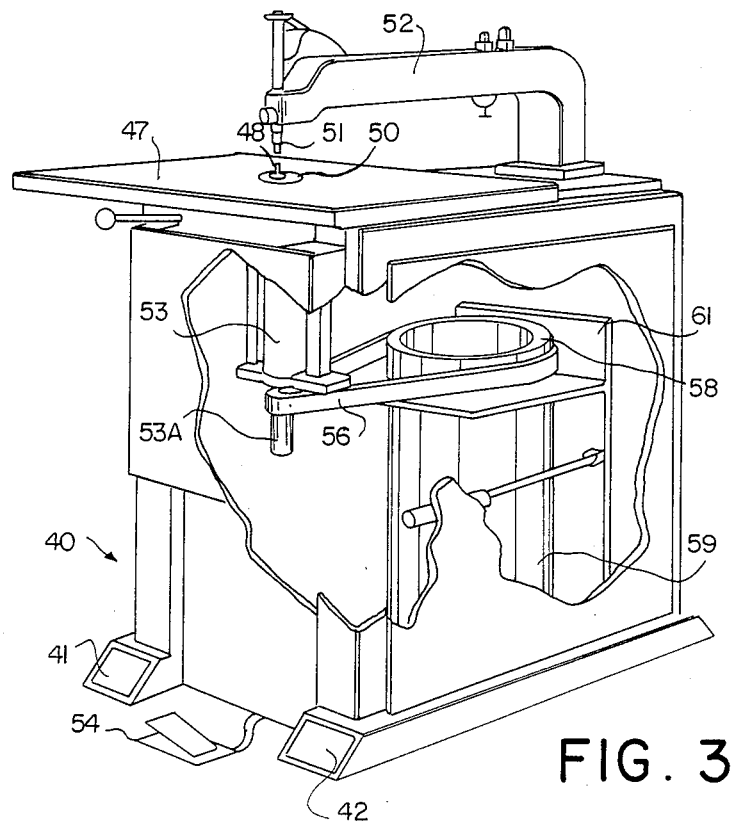
FIG. 3
FIG. 4
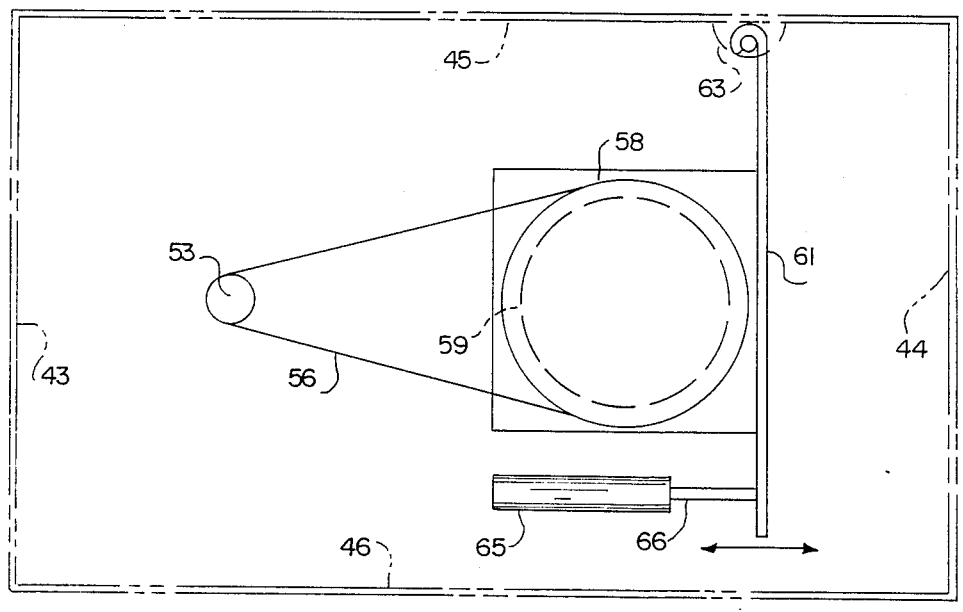

DRIVE BELT TENSION CONTROL APPARATUS FOR INVERTED ROOTER

TECHNICAL FIELD AND BACKGROUND OF THE INVENTION

This invention relates to a drive belt tension control apparatus for an inverted router. An inverted router is a particular type of woodworking machine wherein the operator is protected from the router bit by positioning the workpiece on a table and making cut in the workpiece from the underside. The table has on opening through which protrudes the router bit, which is mounted on a spindle. A foot operated pedal controls movement of the router bit upwardly through the table opening into workpiece engagement and downwardly out of workpiece engagement. The router bit moves vertically on a precise axis in order that the cuts be precisely positioned. This axis is defined by a guide pin which is positioned on the same axis and is used to guide the workpiece on the table.

In most types of inverted routers the spindle is driven by a motor through a pulley and belt arrangement. It is important to maintain the tension on this belt within a relatively narrow range. If the belt tension is too high the spindle may be deflected off of the proper rotational axis and the life of the bearings in the spindle assembly substantially shortened. If the tension is too low slippage between the belt and one or both of the pulleys can reduce the speed of the spindle to below its optimum speed, especially when the router's spindle is under load while a cut is being made. Reduced spindle speed can cause the router bit to chatter in the workpiece, stop, and cause excessive wear to the belt and pulley.

Prior art belt tensioning devices comprise brackets which are loosened while the tension is adjusted, and then tightened to maintain the tension at that point. However, this method is highly inaccurate and time-consuming. Even if the tension is adjusted properly, belt elongation, temperature, humidity and vibration can very quickly cause the tension to move out of proper adjustment. Ideally, tension should be controlled constantly, and should be variable, if necessary, to take into account environmental and operating variations. Using the motor as a tensioning weight cannot be done since the motor and spindle must be maintained in proper axial alignment with each other.

SUMMARY OF THE INVENTION

Therefore, it is an object of the invention to provide a drive belt tension control which constantly maintains proper belt tension on the drive belt and pulleys.

It is another object of the invention to provide a drive belt tension control which extends spindle bearing life and maintains proper spindle speed.

It is another object of the invention to provide a drive belt tension control which requires no periodic manual adjustment.

It is another object of the invention to provide a drive belt tension control which maintains proper axial alignment between the spindle and drive motor.

These and other objects of the present invention are achieved in the preferred embodiments disclosed below by providing in an inverted router characterized by having a drive motor, a motor driven pulley, a spindle, a spindle drive pulley and a drive belt for transferring power from the motor driven pulley to the spindle, the improvement comprising drive belt tension control means. The drive belt tension control means comprises mounting means for mounting the motor driven pulley in variable spaced-apart relation to the spindle drive pulley and pressure means for exerting a predetermined pressure on the motor drive pulley and thereby a predetermined tension on the drive belt.

According to one preferred embodiment of the invention, the mounting means comprises means pivotally mounting the motor for pivotal movement towards and away from the spindle drive pulley. The drive motor and the spindle are each vertically disposed and wherein the mounting means comprises a vertically-disposed plate pivotally mounted to one vertically-disposed side wall of the router.

According to one preferred embodiment of the invention, the pressure means comprises a fluid pressure cylinder—preferably a pneumatic pressure cylinder.

According to another preferred embodiment of the invention, the mounting means comprise a plate mounted for sliding movement relative to the spindle drive pulley.

Preferably, mounting means includes a pair of spaced-apart, opposed slide rails positioned on opposing vertical side walls of the router and the plate positioned for sliding movement in the slide rails.

According to yet another preferred embodiment, the invention includes an inverted router characterized by having a drive motor, a motor driven pulley, a spindle, a spindle drive pulley, a drive belt for transferring power from the motor driven pulley to the spindle, means for tracking the drive belt on the pulleys as the spindle is raised and lowered to move a router bit carried by the spindle into and out of workpiece engaging relation. The improvement according to the invention comprises drive belt tension control means, the drive belt tension control means comprising mounting means for mounting the motor driven pulley in variable spaced-apart relation to the spindle drive pulley, and pressure means for exerting a predetermined pressure on the motor drive pulley and thereby a predetermined tension on the drive belt.

According to one preferred embodiment of the invention, the mounting means comprises means pivotally mounting the motor for pivotal movement towards and away from the spindle drive pulley.

According to another preferred embodiment of the invention, the drive motor and the spindle are each vertically disposed and wherein the mounting means comprises a vertically-disposed plate pivotally mounted to one vertically-disposed side wall of the router.

According to yet another preferred embodiment of the invention, the mounting means comprise a plate mounted for sliding movement relative to the spindle drive pulley.

Preferably, the mounting means includes a pair of spaced-apart, opposed slide rails positioned on opposing vertical side walls of the router and the plate positioned for sliding movement in the slide rails.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 3 is a perspective view of an inverted router, with parts broken away, according to a second embodiment of the invention;

FIG. 4 is a fragmentary top plan view of the major drive components of the inverted router shown in FIG. 3.

DESCRIPTION OF THE PREFERRED EMBODIMENT AND BEST MODE

Figure 1:
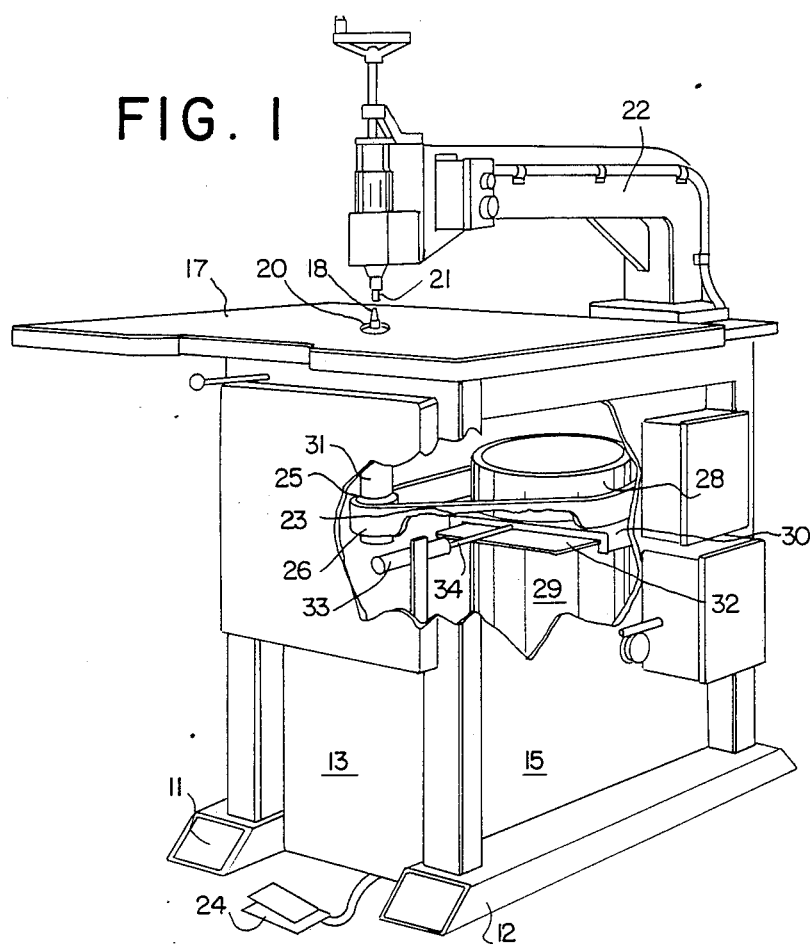
FIG. 1 is a perspective view of an inverted router, with parts broken away, according to one embodiment of the invention.

Referring now specifically to the drawings, a tension control apparatus according to the present invention is illustrated in FIG. 1 and shown generally at reference numeral 10. Router 10 is constructed on a steel frame which includes a pair of hollow support skids 11 and 12 by which router 10 can be moved by a forklift. As is shown by simultaneous reference to FIGS. 1 and 2, the operating components of router 10 are housed within front and rear vertical wall panels 13 and 14, and side panels 15 and 16. A workpiece (not shown) is supported on a table 17 as it moved over a router bit 18 which extends upwardly through an opening 20 in table 17. A guide pin 21 positioned on the end of a guide arm 22 is used to guide a template and thereby the workpiece.

Router bit 18 is mounted on the upper end of a spindle 23 by means of a chuck (not shown). Spindle 23 and therefore the router bit 18 is moved up and down by a foot pedal 24. A spindle pulley 25 mounted on the lower end of spindle 23 carries a woven drive belt 26. Drive belt 26 also passes around a motor pulley 28 mounted for rotation on a drive motor 29. As is shown in FIG. 1, motor pulley 28 is much wider than belt 26. As spindle 23 is raised and lowered, belt 26 rides up and down motor pulley 28 so that it remains trained in driving relation to the vertically moving spindle 23.

Figure 2:
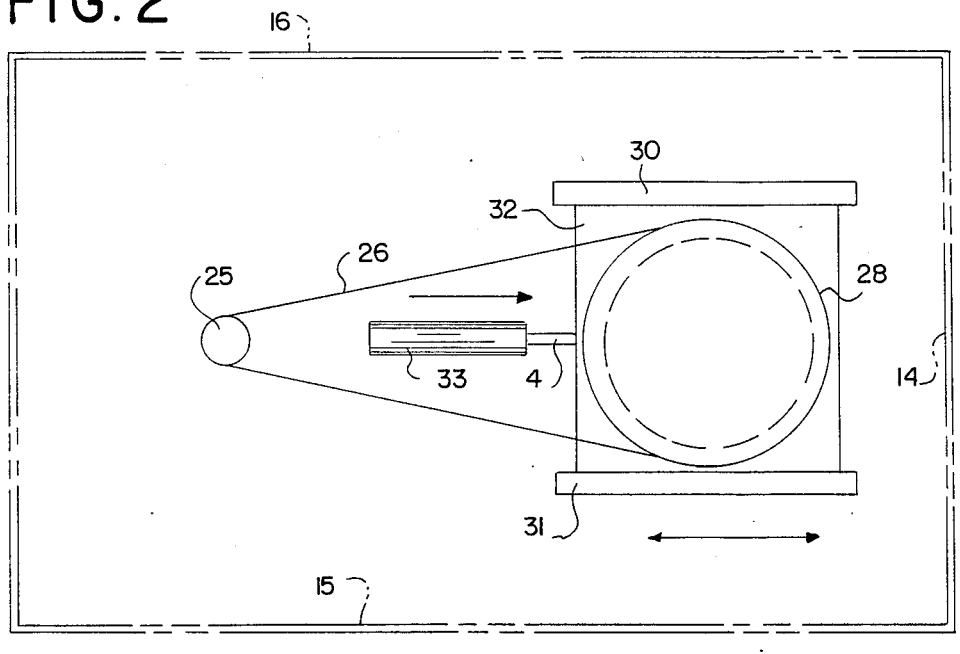
FIG. 2 is a fragmentary top plan view of the major drive components of the inverted router shown in FIG. 1.

Proper tension is maintained on belt 26 by means of a pair of slide rails 30 and 31 mounted on side walls 16 and 15, respectively. Preferably, these slide rails 30 and 31 are mounted in vibration absorbing rubber mounts (not shown). LP-13 5A pads are a suitable mount. These pads comprise two layers of neoprene separated by a nylon filler material. This structure is also shown in FIG. 2. Motor 29 is mounted on a steel plate 32, the opposing edges of which are mounted for sliding movement in slide rails 30 and 31. A pneumatic cylinder 33 is mounted in a fixed position in front of and in vertical alignment with the front edge of plate 32. A piston rod 34 is responsive to pneumatic pressure to urge plate 32 in a direction away from spindle pulley 25.

Figure 5:
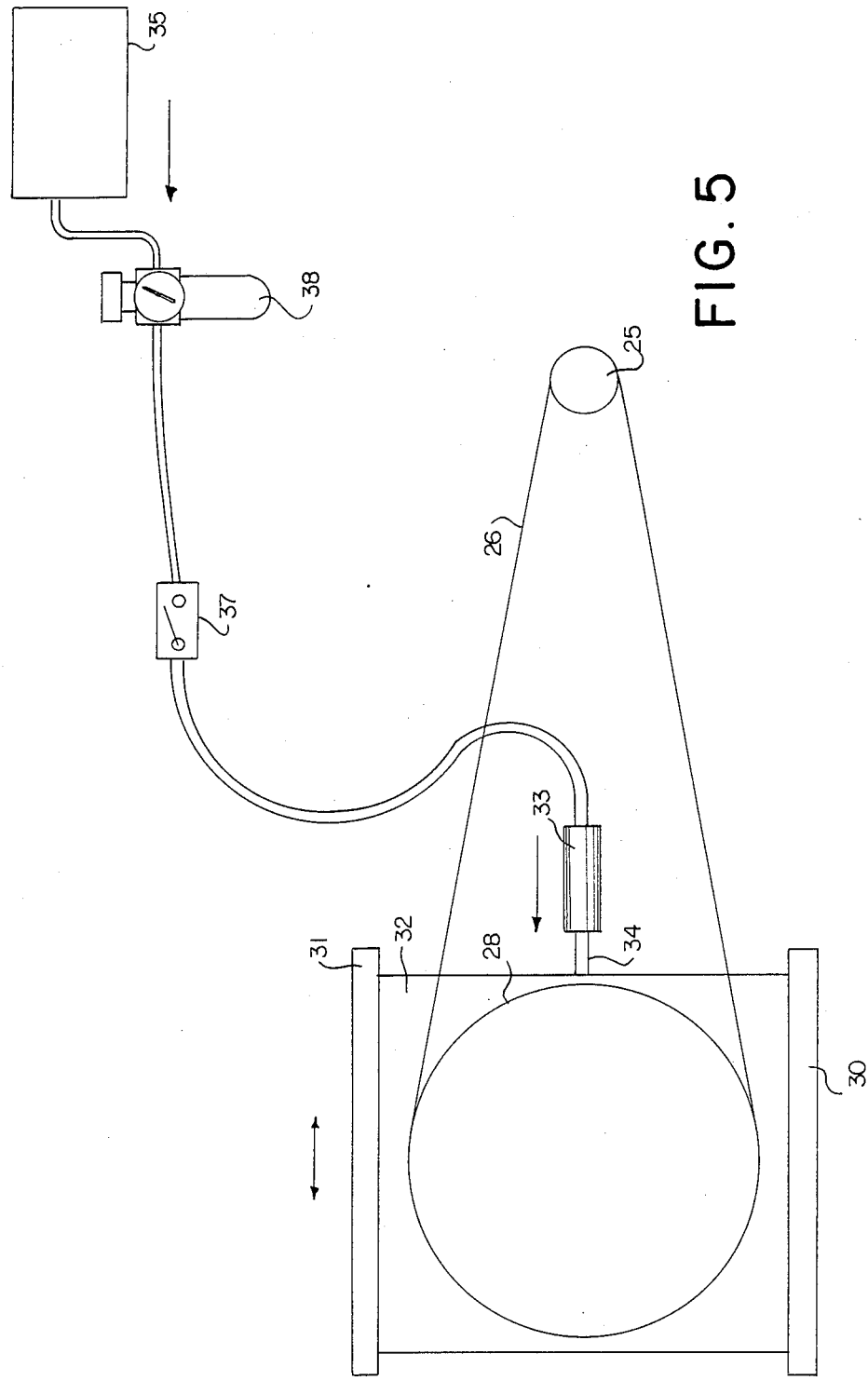
FIG. 5 is a pneumatic circuit diagram of the tension control apparatus shown in FIGS. 1 and 2.

Pressure is controlled by a pneumatic circuit illustrated in FIG. 5. Optimum tension on the belt 26 is determined empirically and is expressed in terms of "separation force" on the belt 26. As is shown in FIG. 5, pressurized air is supplied from an air compressor 35 to a pressure regulator 36. Assuming proper belt separation force is 120 psi and a 1.25 inch bore in cylinder 33, air at a pressure of 100 psi would be supplied from pressure regulator 36. An "on-off" switch 37 permits the tension control apparatus to be switched on and off as desired. As is apparent, any variables such as belt elongation are compensated for, since the piston rod 34 will extend or retract as required to exert the same separation force on belt 26.

Another embodiment of the tension control apparatus is shown in FIGS. 3 and 4. Router 40 is constructed on a steel frame which includes a pair of support skids 41 and 42 as with router 10. As is shown by simultaneous reference to FIGS. 3 and 4, the operating components of router 40 are housed within front and rear vertical wall panels 43 and 44, and side panels 45 and 46. A workpiece (not shown) is supported on a table 47 as it moved over a router bit 48 which extends upwardly through an opening 50 in table 47. A guide pin 51 positioned on the end of a guide arm 52 is used with a template to guide the workpiece.

Router bit 48 is mounted on the upper end of a spindle 53 by means of a chuck (not shown). Spindle 53 and therefore the router bit 48 is moved up and down through a pneumatic circuit apparatus by a foot pedal 54. Spindle 53 includes an elongate downwardly extending spindle pulley 53A which carries a woven drive belt 56. In contrast to router 10 shown in FIGS. 1 and 2, belt 56 remains in a vertically stationary position on a motor pulley 58 as spindle 53 is moved up and down. Instead, spindle pulley 53A itself moves up and down causing relative movement between pulley 53A and belt 56. Belt 56 is therefore remains trained in relation to motor pulley 58.

Motor pulley 58 is mounted for rotation on a drive motor 59. Drive motor 59 is mounted by its feet onto a vertically positioned steel plate 61. Steel plate 61 is pivotally mounted by means of vertically spaced hinges 63 on side wall 45 of router 40. A pneumatic cylinder 65 is mounted in fixed relation within router 40 in front of the side of plate 61 remote from hinges 63. A piston rod 66 is responsive to pneumatic pressure to urge plate 61 in the direction away from spindle 53. The pneumatic system operates substantially as illustrated in FIG. 5 and explained above.

As is apparent, manual adjustment of the belt tension is eliminated by the apparatus described above. Instead, tension is automatically maintained at a pre-determined optimum despite the occurrence of variable. If an increase or decrease in belt tension is desired, the pressure regulator 36 is adjusted accordingly.

A tension control apparatus is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In an inverted router characterized by having a drive motor, a motor driven pulley, a spindle, and a drive belt for transferring power from the motor driven pulley to said spindle, the improvement comprising drive belt tension control apparatus, said drive belt tension control apparatus comprising:

(a) mounting means for mounting said motor driven pulley in continuously variable spaced-apart relation to said spindle during machine operation;

(b) pressure means for exerting a predetermined pressure on said motor driven pulley and thereby a predetermined tension on said drive belt during machine operation.

2. In an inverted router according to claim 1, wherein said mounting means comprises means for mounting said motor for pivotal movement towards and away from said spindle.

3. In an inverted router according to claim 2, wherein said drive motor and said spindle are each vertically disposed and wherein said mounting means comprises a vertically-disposed plate pivotally mounted to one vertically-disposed side wall of said router.

4. In an inverted router according to claim 2, wherein said pressure means comprises a fluid pressure cylinder and piston assembly.

5. In an inverted router according to claim 2, wherein said pressure means comprises a pneumatic pressure cylinder and piston assembly.

6. In an inverted router according to claim 1, wherein said mounting means comprise a plate mounted for sliding movement relative to said spindle.

7. In an inverted router according to claim 6, wherein said mounting means includes a pair of spaced-apart, opposed slide rails positioned on opposing vertical side walls of said router and said plate positioned for sliding movement in said slide rails.

8. In an inverted router according to claim 6, wherein said pressure means comprises a fluid pressure cylinder and piston assembly, with one of the cylinder or the piston mounted on a stationary portion of the router and the other of the cylinder and piston engaging said plate.

9. In an inverted router according to claim 8, wherein said pressure means comprises a pneumatic pressure cylinder.

10. In an inverted router characterized by having a drive motor, a motor driven pulley, a spindle, a spindle, a drive belt for transferring power from the motor driven pulley to said spindle, means for tracking said drive belt on said spindle as said spindle is raised and lowered to move a router bit carried by said spindle into and out of workpiece engaging relation, the improvement comprising drive belt tension control apparatus, said drive belt tension control means comprising:

(a) mounting means for mounting said motor driven pulley in continuously variable spaced-apart relation to said spindle during machine operation;

(b) pressure means for exerting a predetermined pressure on said motor driven pulley and thereby a predetermined tension on said drive belt during machine operation.

11. In an inverted router according to claim 10, wherein said mounting means comprises means pivotally mounting said motor for pivotal movement towards and away from said spindle.

12. In an inverted router according to claim 11, wherein said drive motor and said spindle are each vertically disposed and wherein said mounting means comprises a vertically-disposed plate pivotally mounted to one vertically-disposed side wall of said router.

13. In an inverted router according to claim 10, wherein said pressure means comprises a fluid pressure cylinder and piston.

14. In an inverted router according to claim 10, wherein said pressure means comprises a pneumatic pressure cylinder and piston.

15. In an inverted router according to claim 10, wherein said mounting means comprise a plate mounted for sliding movement relative to said spindle drive pulley.

16. In an inverted router according to claim 15, wherein said mountinq means includes a pair of spaced-apart, opposed slide rails positioned on opposing vertical side walls of said router and said plate positioned for sliding movement in said slide rails.

17. In an inverted router according to claim 15, wherein said pressure means comprises a fluid pressure cylinder and piston assembly, with one of the cylinder or the piston mounted on a stationary portion of the router and the other of the cylinder and piston engaging said plate.

18. In an inverted router according to claim 17, wherein said pressure means comprises a pneumatic pressure cylinder.

* * * * *